United States Patent
Li

(10) Patent No.: US 9,882,468 B2
(45) Date of Patent: Jan. 30, 2018

(54) POWER CONVERSION DEVICE AND CONTROLLING METHOD THEREOF

(71) Applicant: DELTA ELECTRONICS, INC., Taoyuan Hsien (TW)

(72) Inventor: Sheng-Hua Li, Taoyuan Hsien (TW)

(73) Assignee: DELTA ELECTRONICS INC., Taoyuan Hsien (TW)

(*) Notice: Subject to any disclaimer, the term of this patent is extended or adjusted under 35 U.S.C. 154(b) by 0 days.

(21) Appl. No.: 14/930,011

(22) Filed: Nov. 2, 2015

(65) Prior Publication Data

US 2016/0211768 A1 Jul. 21, 2016

(30) Foreign Application Priority Data

Jan. 16, 2015 (TW) .............................. 104101480 A

(51) Int. Cl.
*H02M 3/04* (2006.01)
*H02M 1/00* (2006.01)

(52) U.S. Cl.
CPC ...... *H02M 3/04* (2013.01); *H02M 2001/0032* (2013.01); *Y02B 70/16* (2013.01)

(58) Field of Classification Search
CPC .. H02M 3/04; H02M 2001/0032; Y02B 70/16
See application file for complete search history.

(56) References Cited

U.S. PATENT DOCUMENTS

| 2009/0116269 A1* | 5/2009 | Yegnashankaran | H02M 3/33507 363/84 |
| 2015/0364913 A1* | 12/2015 | Minoya | H02H 9/025 361/93.9 |

FOREIGN PATENT DOCUMENTS

| CN | 101232237 A | 7/2008 |
| CN | 101557159 A | 10/2009 |
| WO | 2014129126 A1 | 2/2017 |

* cited by examiner

*Primary Examiner* — Jue Zhang
(74) *Attorney, Agent, or Firm* — Kirton McConkie; Evan R. Witt

(57) ABSTRACT

A power conversion device includes a power supplying terminal, a switching converter, a signal injector, a coupler circuit, a detecting circuit and a controller. After an input voltage is converted into an output voltage by the switching converter, the output voltage is outputted to a load through the power supplying terminal. The signal injector provides a signal. When the load is connected with the power supplying terminal, an operating parameter at the first end of the coupler circuit has a first variation value in response to the signal. When the load is disconnected from the power supplying terminal, the operating parameter at the first end of the coupler circuit has a second variation value in response to the signal. According to the detecting result of the detecting circuit, a switching action of the switching element is selectively enabled or disabled by the controller.

13 Claims, 4 Drawing Sheets

POWER CONVERSION DEVICE AND CONTROLLING METHOD THEREOF

FIELD OF THE INVENTION

The present invention relates to a power conversion device and a controlling method, and more particularly to a power conversion device and a controlling method for controlling at least one switch element of a switching converter according to a result of judging whether a load is connected to the power conversion device.

BACKGROUND OF THE INVENTION

With increasing development and advance of electronic industries, a variety of electronic devices with different functions are introduced into the market. These electronic devices can meet different requirements and gradually become essential in our daily lives.

During normal operations, the electronic device has to receive a corresponding voltage. Consequently, the electronic device is electrically connected with a power conversion device for receiving the desired voltage. For example, the power conversion device receives an input voltage from a battery, a utility power source or a regeneration power source and converts the input voltage into an output voltage. When the electronic device is electrically connected with the power conversion device, the output voltage is outputted from the power conversion device to the electronic device.

The power conversion device comprises a switching converter. In addition, the switching converter comprises at least one switch element. The switching converter receives the input voltage. By alternately turning on and turning off the switch element, the switching converter may convert the input voltage into an output voltage. When a connector (e.g. a plug or a USB connector) of an electronic device is connected to the power conversion device, the output voltage is provided to the electronic device. Consequently, the electronic device can be normally operated.

However, the conventional power conversion device still has some drawbacks. For example, if no electronic device is electrically connected to the power conversion device when the power conversion device receives the input voltage, the switching action of the switch element of the switching converter is continuously performed to generate the output voltage. Due to the switching loss of the switch element, the conventional power conversion device continuously consumes the energy of the input voltage. In case that the electrical quantity of the power source is limited (e.g. a battery), the problem of the switching loss is more evident.

Nowadays, some mechanisms are provided for solving the above problems. In accordance with an approach, the connector of the electronic device (i.e. a load) is additionally equipped with a detecting pin. When the connector of the load is connected with the power conversion device, the detecting pin of the connector generates a detecting signal. After the detecting signal is received by the power conversion device, the switching action of the switching element of the switching converter is enabled. Consequently, the undesired energy loss can be reduced. Since the connector of the load is designed according to the known specifications, the additional detecting pin may increase the fabricating cost.

In accordance with another approach, the conventional power conversion device is equipped with an external switch for controlling the operation of the switching element of the switching converter. When the connector of the load is connected with the power conversion device, the external switch is turned on by the user, and thus the switching action of the switching element of the switching converter is performed. When the connector of the load is disconnected from the power conversion device, the external switch is turned off by the user, and thus the switching action of the switching element of the switching converter is stopped. Consequently, the undesired energy loss is reduced. Since the external switch is controlled by the user according to the result of judging whether the connector of the load is connected with or disconnected from the power conversion device, this controlling method is not user-friendly. If the user forgets to disable the external switch when the connector of the load is disconnected from the power conversion device, the switching action of the switching element of the switching converter is continuously performed. Under this circumstance, the problem of generating the switching loss still occurs.

Therefore, there is a need of providing a power conversion device and a controlling method in order to overcome the above drawbacks.

SUMMARY OF THE INVENTION

The present invention provides a power conversion device and a controlling method of the power conversion device. Consequently, when the load is disconnected from the power conversion device, the power consumption is reduced.

In accordance with an aspect of the present invention, there is provided a power conversion device. The power conversion device includes a power supplying terminal, a switching converter, a signal injector, a coupler circuit, a detecting circuit and a controller. The power supplying terminal is detachably connected with a load. The switching converter is electrically connected with the power supplying terminal, and includes at least one switch element, wherein an input voltage is converted into an output voltage by the switching converter and the output voltage is outputted to the load through the power supplying terminal. The signal injector provides a signal. A first end of the coupler circuit receives the signal. A second end of the coupler circuit transmits the signal to the power supplying terminal. When the load is connected with the power supplying terminal, an operating parameter at the first end of the coupler circuit has a first variation value in response to the signal. When the load is disconnected from the power supplying terminal, the operating parameter at the first end of the coupler circuit has a second variation value in response to the signal. The detecting circuit is used for detecting the operating parameter. The controller is electrically connected with the detecting circuit and the at least one switch element. When the detecting circuit judges that the operating parameter at the first end of the coupler circuit has the first variation value, a switching action of the at least one switching element is enabled, so that the input voltage is converted into the output voltage by the switching converter and the output voltage is outputted to the load through the power supplying terminal. When the detecting circuit judges that the operating parameter at the first end of the coupler circuit has the second variation value, the switching action of the at least one switching element is disabled.

In accordance with another aspect of the present invention, there is provided a controlling method of a power conversion device. The power conversion device includes a power supplying terminal, a switching converter, a signal injector, a coupler circuit, a detecting circuit and a controller. The power supplying terminal is detachably connected with a load. The switching converter is electrically connected with the power supplying terminal and includes at least one switch element. A first end of the coupler circuit is electrically connected with the signal injector. A second end of the coupler circuit is electrically connected with the power supplying terminal. The detecting circuit is electrically connected with the first end of the coupler circuit. The controller is electrically connected with the detecting circuit and the at least one switch element. Firstly, the power conversion device is activated. Then, the signal injector provides a signal. Then, the signal is transmitted to the power supplying terminal through the coupler circuit. Depending on whether the load is connected with the power supplying terminal or disconnected from the power supplying terminal, an operating parameter at the first end of the coupler circuit has a first variation value or a second variation value in response to the signal, wherein the first variation value and the second variation value are different from each other. Then, the detecting circuit detects whether the operating parameter at the first end of the coupler circuit has the first variation value or the second variation value. Then, the controller selectively enables or disables a switching action of the at least one switch element according to a detecting result of the detecting circuit. When the switching action of the at least one switch element is enabled, an input voltage is converted into an output voltage by the switching converter and the output voltage is outputted to the load through the power supplying terminal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
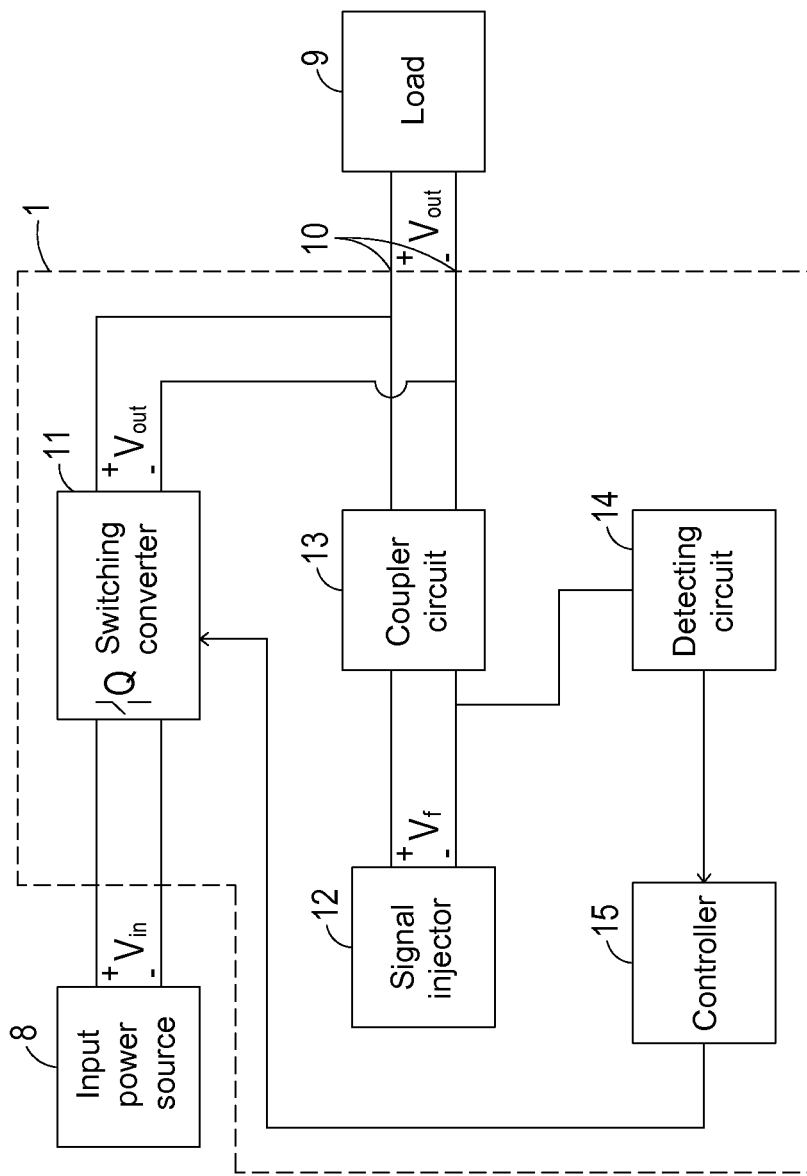
FIG. 1 is a schematic circuit diagram illustrating a power conversion device according to an embodiment of the present invention.

FIG. 1 is a schematic circuit diagram illustrating a power conversion device according to an embodiment of the present invention. The power conversion device 1 is electrically connected with an input power source 8 for receiving an input voltage $V_{in}$ from the input power source 8 and converting the input voltage $V_{in}$ into an output voltage $V_{out}$. When a load 9 is electrically connected with the power conversion device 1, the output voltage $V_{out}$ is outputted from the power conversion device 1 to the load 9. Consequently, the load 9 can be normally operated.

An example of the power conversion device 1 includes but is not limited to an uninterrupted power supply or a charger. The load 9 is detachably connected with the power conversion device 1. For example, through a connector (e.g. a plug or a USB connector) of the load 9, the load 9 may be electrically connected with the power conversion device 1. An example of the input power source 8 includes but is not limited to a battery, a utility power source or a regeneration power source.

In this embodiment, the power conversion device 1 comprises a power supplying terminal 10, a switching converter 11, a signal injector 12, a coupler circuit 13, a detecting circuit 14 and a controller 15. The power supplying terminal 10 is detachably connected with the load 9. An input terminal of the switching converter 11 is electrically connected with the input power source 8 so as to receive the input voltage $V_{in}$. An output terminal of the switching converter 11 is electrically connected with the power supplying terminal 10 of the power conversion device 1. The switching converter 11 comprises at least one switch element Q. By alternately turning on and turning off the switch element Q, the switching converter 11 may convert the input voltage $V_{in}$ into an output voltage $V_{out}$. The output voltage $V_{out}$ is provided to the power supplying terminal 10.

In case that the input voltage $V_{in}$ is an AC input voltage, the switching converter 11 is an AC-to-DC converter, and the load 9 is a DC load. Whereas, in case that the input voltage $V_{in}$ is a DC input voltage, the switching converter 11 is a DC-to-AC converter, and the load 9 is an AC load.

The signal injector 12 provides a signal $V_f$ such as a frequency signal. Preferably but not exclusively, the frequency signal $V_f$ is a high frequency signal. A first end of the coupler circuit 13 is electrically connected with the signal injector 12 so as to receive the signal $V_f$. A second end of the coupler circuit 13 is electrically connected with the power supplying terminal 10 so as to transmit the signal $V_f$ to the power supplying terminal 10. In case that the load 9 is disconnected from the power supplying terminal 10, the load 9 is not electrically connected with the power supplying terminal 10. Consequently, the power supplying terminal 10 is in an open state. Under this circumstance, it is considered that the power supplying terminal 10 is electrically connected with an impedance element with an infinitely large impedance value. Whereas, in case that the load 9 is electrically connected with the power supplying terminal 10, the power supplying terminal 10 is in a close state. Under this circumstance, it is considered that the power supplying terminal 10 is electrically connected with an impedance element with a smaller impedance value. When the load 9 is electrically connected with the power supplying terminal 10, an operating parameter (e.g. a voltage) at the first end of the coupler circuit 13 has a first variation value in response to the signal $V_f$. On the other hand, when the load 9 is disconnected from the power supplying terminal 10, the operating parameter at the first end of the coupler circuit 13 has a second variation value in response to the signal $V_f$.

The detecting circuit 14 is electrically connected with the first end of the coupler circuit 13. Consequently, the operating parameter at the first end of the coupler circuit 13 is detected by the detecting circuit 14. In particular, the first variation value or the second variation value can be detected by the detecting circuit 14.

The controller 15 is electrically connected with the detecting circuit 14 and a control terminal of the switch element Q of the switching converter 11. According to the detecting result of the detecting circuit 14, the switching action of the switch element Q is correspondingly controlled by the controller 15. If the detecting result of the detecting circuit 14 indicates that the operating parameter at the first end of the coupler circuit 13 has the first variation value, the controller 15 realizes that the load 9 is electrically connected with the power supplying terminal 10. Under this circumstance, the switching action of the switching element Q is enabled, and thus the output voltage $V_{out}$ is outputted from the switching converter 11. If the detecting result of the detecting circuit 14 indicates that the operating parameter at the first end of the coupler circuit 13 has the second variation value, the controller 15 realizes that the load 9 is disconnected from the power supplying terminal 10. Under this circumstance, the switching action of the switching element Q is disabled, and thus the switching converter 11 stops outputting the output voltage $V_{out}$.

In an embodiment, the signal injector 12, the detecting circuit 14 and the controller 15 are separate components or circuits. In another embodiment, the signal injector 12, the detecting circuit 14 and the controller 15 are integrated into a digital signal processor (DSP).

From the above descriptions, the signal injector 12 provides the signal $V_f$ to the power supplying terminal 10 of the power conversion device 1 through the coupler circuit 13, and thus the operating parameter at the first end of the coupler circuit 13 has the first variation value or the second variation value in response to the signal $V_f$. That is, the operating parameter at the first end of the coupler circuit 13 has the first variation value if the load 9 is electrically connected with the power supplying terminal 10, and the operating parameter at the first end of the coupler circuit 13 has the second variation value if the load 9 is disconnected from the power supplying terminal 10. Consequently, the switching action of the switching element Q is enabled by the controller 15 when the load 9 is electrically connected with the power supplying terminal 10, and the switching action of the switching element Q is disabled by the controller 15 when the load 9 is disconnected from the power supplying terminal 10. Since the switching action of the switching element Q is disabled when the load 9 is disconnected from the power supplying terminal 10, the switching loss is reduced. In other words, the power consumption is reduced.

Figure 2:
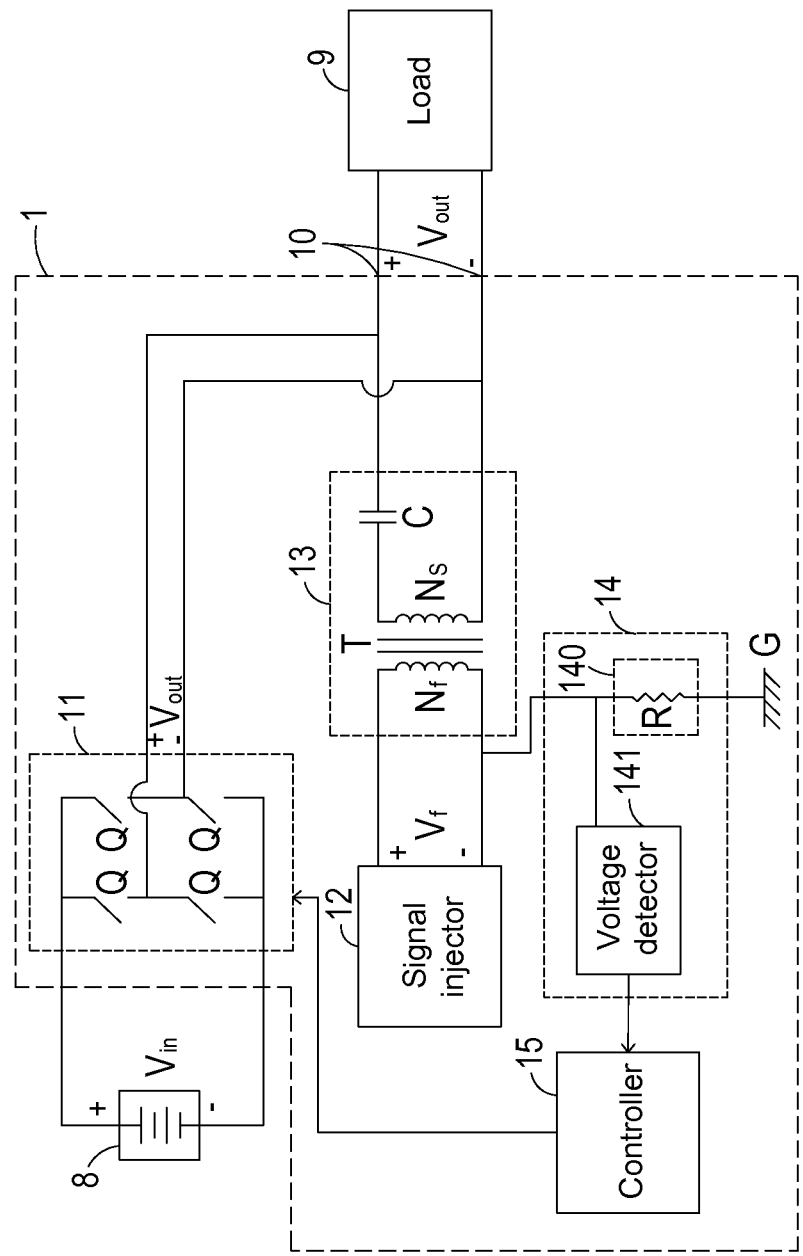
FIG. 2 is a schematic circuit diagram illustrating the detailed circuitry of the power conversion device of FIG. 1.

FIG. 2 is a schematic circuit diagram illustrating the detailed circuitry of the power conversion device of FIG. 1. In this embodiment, the switching converter 11 is a full-bridge inverter circuit including four switch elements Q. Two switch elements Q at the upper bridge arm and two switch elements Q at the lower bridge arm are connected with each other in parallel. Alternatively, in another embodiment, the switching converter 11 is a half-bridge inverter circuit composed of two switch elements Q.

The coupler circuit 13 comprises a transformer T and a capacitor C. A primary winding assembly $N_f$ of the transformer T is electrically connected with the signal injector 12. In other words, the primary winding assembly $N_f$ of the transformer T is the first end of the coupler circuit 13. A first end of the capacitor C is electrically connected with a secondary winding assembly $N_{f1}$ of the transformer T. A second end of the capacitor C is electrically connected with the power supplying terminal 10. In other words, the second end of the capacitor C is the second end of the coupler circuit 13. Moreover, in case that the signal $V_f$ is a high frequency signal, the transformer T is a high frequency transformer.

The detecting circuit 14 comprises an impedance circuit 140 and a voltage detector 141. A first end of the impedance circuit 140 is electrically connected with the primary winding assembly $N_f$ of the transformer T. A second end of the impedance circuit 140 is electrically connected with a ground terminal G. In this embodiment, the impedance circuit 140 comprises a resistor R. That is, the impedance circuit 140 has an impedance value. Under this circumstance, the output end of the signal injector 12 and the impedance circuit 140 are equivalent to as a voltage divider. When the disconnecting relationship between the load 9 and the power supplying terminal 10 is switched to the connecting relationship between the load 9 and the power supplying terminal 10, the voltage at first end of the impedance circuit 140 (or the primary winding assembly $N_f$ of the transformer T) has the first variation value in response to the signal $V_f$. On the other hand, when the connecting relationship between the load 9 and the power supplying terminal 10 is switched to the disconnecting relationship between the load 9 and the power supplying terminal 10, the voltage at first end of the impedance circuit 140 (or the primary winding assembly $N_f$ of the transformer T) has the second variation value in response to the signal $V_f$.

A first end of the voltage detector 141 is electrically connected with the primary winding assembly $N_f$ of the transformer T and the first end of the impedance circuit 140. A second end of the voltage detector 141 is electrically connected with the controller 15. The voltage detector 141 can detect whether the voltage at the first end of the voltage detector 141 has the first variation value or the second variation value.

Figure 3:
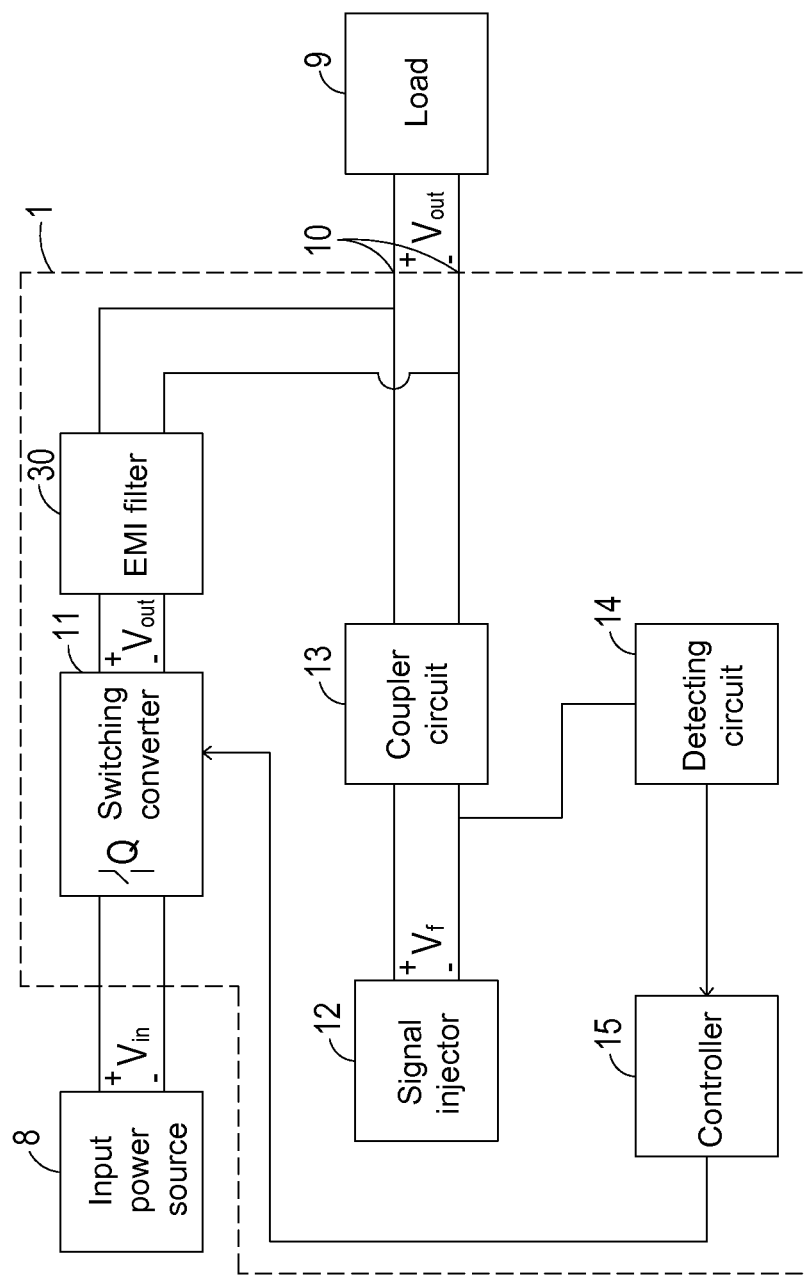
FIG. 3 is a schematic circuit diagram illustrating a variant example of the detailed circuitry of the power conversion device of FIG. 1.

FIG. 3 is a schematic circuit diagram illustrating a variant example of the detailed circuitry of the power conversion device of FIG. 1. In this embodiment, the power conversion device 1 further comprises an electromagnetic interference (EMI) filter 30. The EMI filter 30 is connected between the switching converter 11 and the power supplying terminal 10 so as to filter off the high frequency component of the output voltage $V_{out}$.

Figure 4:
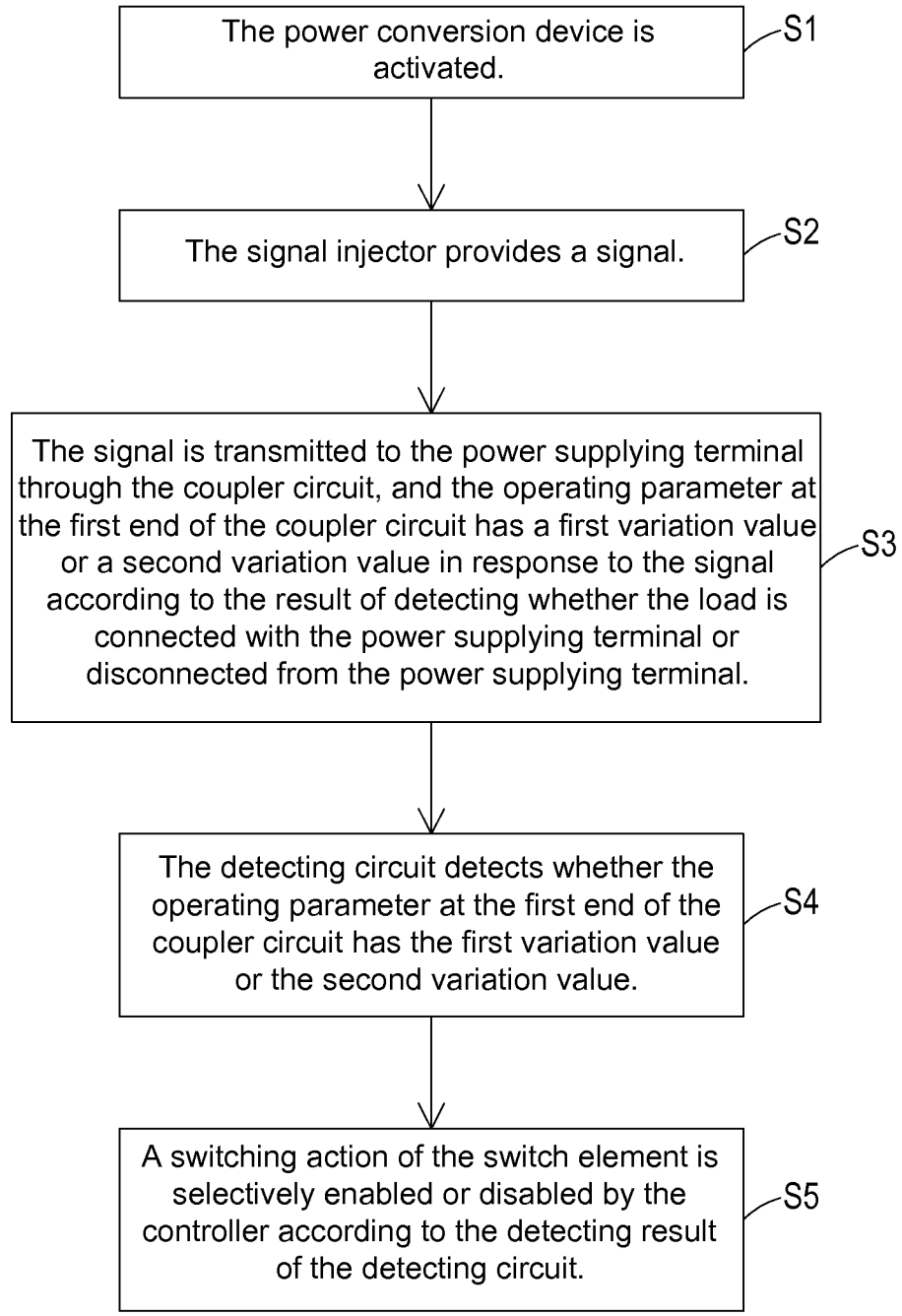
FIG. 4 is a flowchart illustrating a controlling method of the power conversion device of FIG. 1.

FIG. 4 is a flowchart illustrating a controlling method of the power conversion device of FIG. 1. Firstly, in a step S1, the power conversion device 1 is activated. Then, in a step S2, the signal injector 12 provides a signal $V_f$. In a step S3, the signal $V_f$ is transmitted to the power supplying terminal 10 through the coupler circuit 13. According to the result of detecting whether the load 9 is connected with the power supplying terminal 10 or disconnected from the power supplying terminal 10, the operating parameter at the first end of the coupler circuit 13 has the first variation value or the second variation value in response to the signal $V_f$. That is, the operating parameter at the first end of the coupler circuit 13 has the first variation value if the load 9 is electrically connected with the power supplying terminal 10, and the operating parameter at the first end of the coupler circuit 13 has the second variation value if the load 9 is disconnected from the power supplying terminal 10.

In the step S4, the detecting circuit 14 detects whether the operating parameter at the first end of the coupler circuit 13 has the first variation value or the second variation value. In the step S5, a switching action of the switch element Q is selectively enabled or disabled by the controller 15 according to the detecting result of the detecting circuit 14. If the detecting result of the detecting circuit 14 indicates that the operating parameter at the first end of the coupler circuit 13 has the first variation value, the controller 15 realizes that the load 9 is electrically connected with the power supplying terminal 10. Under this circumstance, the switching action of the switching element Q is enabled. If the detecting result of the detecting circuit 14 indicates that the operating parameter at the first end of the coupler circuit 13 has the second variation value, the controller 15 realizes that the load 9 is disconnected from the power supplying terminal 10. Under this circumstance, the switching action of the switching element Q is disabled.

From the above descriptions, the present invention provides a power conversion device and a controlling method thereof. The power conversion device includes a power supplying terminal, a switching converter, a signal injector, a coupler circuit, a detecting circuit and a controller. The signal injector provides a signal. The signal is transmitted to the power supplying terminal through the coupler circuit. According to the result of detecting whether the load is connected with the power supplying terminal or disconnected from the power supplying terminal, the operating parameter (e.g. a voltage) at the first end of the coupler circuit has a first variation value or a second variation value in response to the signal. Consequently, the switching action of the switching element is enabled by the controller when the load is electrically connected with the power supplying terminal, and the switching action of the switching element is disabled by the controller when the load is disconnected from the power supplying terminal. Since the switching action of the switching element is disabled when the load is disconnected from the power supplying terminal, the switching loss is reduced. In other words, the power consumption is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion device, comprising:
   a power supplying terminal detachably connected with a load;
   a switching converter electrically connected with the power supplying terminal, and comprising at least one switch element, wherein an input voltage is converted into an output voltage by the switching converter and the output voltage is outputted to the load through the power supplying terminal;
   a signal injector providing a signal;
   a coupler circuit, wherein a first end of the coupler circuit receives the signal, and a second end of the coupler circuit transmits the signal to the power supplying terminal, wherein when the load is connected with the power supplying terminal, an operating parameter at the first end of the coupler circuit has a first variation value in response to the signal, wherein when the load is disconnected from the power supplying terminal, the operating parameter at the first end of the coupler circuit has a second variation value in response to the signal;
   a detecting circuit for detecting the operating parameter; and
   a controller electrically connected with the detecting circuit and the at least one switch element,
   wherein when the detecting circuit judges that the operating parameter at the first end of the coupler circuit has the first variation value, a switching action of the at least one switching element is enabled, wherein when the detecting circuit judges that the operating parameter at the first end of the coupler circuit has the second variation value, the switching action of the at least one switching element is disabled;
   wherein the coupler circuit comprises:
   a transformer, wherein a primary winding assembly of the transformer is electrically connected with the signal injector for receiving the signal, and the primary winding assembly of the transformer is served as the first end of the coupler circuit; and
   a capacitor having a first end electrically connected with a secondary winding assembly of the transformer and a second end electrically connected with the power supplying terminal, wherein the second end of the capacitor is served as the second end of the coupler circuit.

2. The power conversion device according to claim 1, wherein the signal is a frequency signal.

3. The power conversion device according to claim 2, wherein the frequency signal is a high frequency signal.

4. The power conversion device according to claim 1, wherein the input voltage is provided by a battery.

5. The power conversion device according to claim 1, wherein the transformer is a high frequency transformer.

6. The power conversion device according to claim 1, wherein the detecting circuit comprises:
   an impedance circuit having a first end electrically connected with the primary winding assembly of the transformer and a second end electrically connected with a ground terminal, wherein the impedance circuit has an impedance value, and a voltage at the first end of the impedance circuit is the operating parameter, wherein when the load is connected with the power supplying terminal, the operating parameter has the first variation value in response to the signal, wherein when the load is disconnected from the power supplying terminal, the operating parameter has the second variation value in response to the signal; and
   a voltage detector, wherein a first end of the voltage detector is electrically connected with the primary winding assembly of the transformer and the first end of the impedance circuit, and a second end of the voltage detector is electrically connected with the controller, wherein the voltage detector detects whether the voltage at the first end of the voltage detector has the first variation value or the second variation value.

7. The power conversion device according to claim 6, wherein the impedance circuit comprises a resistor.

8. The power conversion device according to claim 1, wherein the load is an AC load, and the switching converter is a DC-to-AC converter.

9. The power conversion device according to claim 1, wherein the power conversion device is an uninterrupted power supply or a charger.

10. The power conversion device according to claim 1, wherein the power conversion device further comprises an electromagnetic interference filter, wherein the electromagnetic interference filter is connected between the switching converter and the power supplying terminal so as to filter off a frequency component of the output voltage.

11. A controlling method of a power conversion device, the power conversion device comprising a power supplying terminal, a switching converter, a signal injector, a coupler circuit, a detecting circuit and a controller, the power supplying terminal being detachably connected with a load, the switching converter being electrically connected with the power supplying terminal and comprising at least one switch element, a first end of the coupler circuit being electrically connected with the signal injector, a second end of the coupler circuit being electrically connected with the power supplying terminal, the detecting circuit being electrically connected with the first end of the coupler circuit, the controller being electrically connected with the detecting circuit and the at least one switch element, the controlling method comprising steps of:

(a) activating the power conversion device;
(b) allowing the signal injector to provide a signal;
(c) transmitting the signal to the power supplying terminal through the coupler circuit, wherein depending on whether the load is connected with the power supplying terminal or disconnected from the power supplying terminal, an operating parameter at the first end of the coupler circuit has a first variation value or a second variation value in response to the signal;
(d) the detecting circuit detecting whether the operating parameter at the first end of the coupler circuit has the first variation value or the second variation value; and
(e) the controller selectively enabling or disabling a switching action of the at least one switch element according to a detecting result of the detecting circuit, wherein when the switching action of the at least one switch element is enabled, an input voltage is converted into an output voltage by the switching converter and the output voltage is outputted to the load through the power supplying terminal;

wherein the coupler circuit comprises:

a transformer, wherein a primary winding assembly of the transformer is electrically connected with the signal injector for receiving the signal, and the primary winding assembly of the transformer is served as the first end of the coupler circuit; and a capacitor having a first end electrically connected with a secondary winding assembly of the transformer and a second end electrically connected with the power supplying terminal, wherein the second end of the capacitor is served as the second end of the coupler circuit.

12. The controlling method according to claim 11, wherein when the load is connected with the power supplying terminal, the operating parameter at the first end of the coupler circuit has the first variation value, wherein when the load is disconnected from the power supplying terminal, the operating parameter at the first end of the coupler circuit has the second variation value.

13. The controlling method according to claim 11, wherein when the operating parameter at the first end of the coupler circuit has the first variation value, the switching action of the at least one switch element is enabled by the controller in the step (e), wherein when the operating parameter at the first end of the coupler circuit has the second variation value, the switching action of the at least one switch element is disabled by the controller in the step (e).

* * * * *